(12) United States Patent
Davies et al.

(10) Patent No.: US 9,160,977 B2
(45) Date of Patent: Oct. 13, 2015

(54) PROVIDING INFORMATION ABOUT VIDEO CONTENT

(75) Inventors: Colin John Davies, Fordingbridge (GB); James Geoffrey Walker, Winchester (GB); Nicholas Thexton, London (GB); Simon John Parnall, Kingswood (GB)

(73) Assignee: Cisco Technology Inc., San Jose, CA (US)

( * ) Notice: Subject to any disclaimer, the term of this patent is extended or adjusted under 35 U.S.C. 154(b) by 987 days.

(21) Appl. No.: 12/452,760

(22) PCT Filed: Jul. 22, 2008

(86) PCT No.: PCT/IB2008/052941
§ 371 (c)(1),
(2), (4) Date: Feb. 16, 2010

(87) PCT Pub. No.: WO2009/016544
PCT Pub. Date: Feb. 5, 2009

(65) Prior Publication Data
US 2010/0146077 A1    Jun. 10, 2010

Related U.S. Application Data

(60) Provisional application No. 60/962,546, filed on Jul. 30, 2007.

(51) Int. Cl.
*G06F 15/16* (2006.01)
*H04N 7/173* (2011.01)
(Continued)

(52) U.S. Cl.
CPC ...... *H04N 7/17318* (2013.01); *G06F 17/30817* (2013.01); *H04N 21/23892* (2013.01); *H04N 21/25841* (2013.01); *H04N 21/25883* (2013.01); *H04N 21/2665* (2013.01); *H04N 21/26283* (2013.01); *H04N 21/4524* (2013.01);
(Continued)

(58) Field of Classification Search
None
See application file for complete search history.

(56) References Cited

U.S. PATENT DOCUMENTS 6,789,204 B2 * 9/2004 Abdelnur et al. ............... 726/1
6,859,799 B1 * 2/2005 Yuen ................................ 1/1
(Continued)

FOREIGN PATENT DOCUMENTS

WO    WO 97/13368    4/1997
WO    WO 00/27119    5/2000
(Continued)

OTHER PUBLICATIONS

Imagemagick.org May 28, 2008 (ImageMagick Studio LLC 2008).
(Continued)

*Primary Examiner* — Abdullahi Salad
(74) *Attorney, Agent, or Firm* — Hahn Loeser & Parks LLP

(57) ABSTRACT

A method of providing information about video content to a client is disclosed. The method includes: receiving a request from a client requesting information about video content, the request including an internet protocol address of the client; establishing (a) a geographic location of the client from the internet protocol address; and (b) a time of the request; identifying one or more content providers available in the geographic location; in dependence on the one or more content providers and the time, retrieving information about the video content from a database; and providing the information to the client. Related apparatus and methods are also disclosed.

16 Claims, 23 Drawing Sheets

(51) Int. Cl.

| | |
|---|---|
| *G06F 17/30* | (2006.01) |
| *H04N 21/2389* | (2011.01) |
| *H04N 21/258* | (2011.01) |
| *H04N 21/262* | (2011.01) |
| *H04N 21/2665* | (2011.01) |
| *H04N 21/45* | (2011.01) |
| *H04N 21/472* | (2011.01) |
| *H04N 21/4722* | (2011.01) |
| *H04N 21/482* | (2011.01) |
| *H04N 21/81* | (2011.01) |
| *H04N 21/8405* | (2011.01) |
| *H04N 21/858* | (2011.01) |

(52) U.S. Cl.
CPC ....... *H04N21/4532* (2013.01); *H04N 21/4722* (2013.01); *H04N 21/47202* (2013.01); *H04N 21/4826* (2013.01); *H04N 21/4828* (2013.01); *H04N 21/8133* (2013.01); *H04N 21/8405* (2013.01); *H04N 21/8586* (2013.01)

(56) References Cited

U.S. PATENT DOCUMENTS

| | | | |
|---|---|---|---|
| 6,983,139 B2 | 1/2006 | Dowling et al. | |
| 7,660,877 B2* | 2/2010 | Roy et al. | 709/219 |
| 7,873,706 B2* | 1/2011 | Thoen | 709/219 |
| 8,799,401 B1* | 8/2014 | Bryar et al. | 709/217 |
| 2002/0184195 A1 | 12/2002 | Qian | |
| 2003/0110490 A1 | 6/2003 | Dew et al. | |
| 2004/0034663 A1* | 2/2004 | Noguchi | 707/104.1 |
| 2004/0088375 A1* | 5/2004 | Sethi et al. | 709/218 |
| 2004/0168184 A1* | 8/2004 | Steenkamp et al. | 725/31 |
| 2005/0021845 A1* | 1/2005 | Yasui et al. | 709/238 |
| 2005/0050027 A1 | 3/2005 | Yeh et al. | |
| 2005/0071323 A1 | 3/2005 | Gabriel et al. | |
| 2006/0286989 A1 | 12/2006 | Illion | |
| 2007/0136295 A1 | 6/2007 | Gorodyansky et al. | |
| 2008/0013540 A1* | 1/2008 | Gast | 370/392 |
| 2008/0172362 A1* | 7/2008 | Shacham et al. | 707/3 |
| 2009/0254954 A1* | 10/2009 | Jeong | 725/105 |

FOREIGN PATENT DOCUMENTS

| | | |
|---|---|---|
| WO | WO 01/13266 A2 | 2/2001 |
| WO | WO 2005/062746 A2 | 7/2005 |

OTHER PUBLICATIONS

"The Internet Movie Database"; imdb.com__18__july__2008 (IMDb.com 2008).
Meevee.com Apr. 14, 2008 (MeeVee, Inc. 2008).
Netflix.com/RSSFeeds Jan. 14, 2008 (Netflix, Inc. 2008).
Pricegrabber.com Nov. 13, 2006.
Radiotimes.com__13__july__2008.
Searchvideo.com Jul. 17, 2007 (AOL, LLC 2006).
Tv.com__30__june__2008 (CNET Networks, Inc. 2008).
Tvguide.com Jun. 30, 2008.
Video.google.com__20__july__2008 (Google 2008).
Weshow.com Jun. 20, 2008.
wikipedia.com__25__june__2008.
Jun. 29, 2011 Office Communication in connection with prosecution of EP 08 789 403.6.
Jun. 21, 2012 Office Communication in connection with prosecution of AU 2008 281467.

\* cited by examiner

Figure 3

LocateTV

New York Stories  Series

Series set in New York. Starring Fred Titmus as Dirk the intrepid stamp collector who, in his on going quest for the rare Penny Black, meets characters who tell him their New York stories.

Starring: Fred Titmus   Producer: John Smith

Embed the latest results for this series in your page here

New York Stories:  Season 1 (1984)

Ep 1: The Penny Black (24 min)
Dirk the intrepid stamp collector start his quest for the elusive Penny …

Ep 2: The sewer man (24 min)
Dirk meets Phil the sewer man and hears a tale with a smell below …

This series is available in your region    Region: UK

On TV
Season 1, Episode 1 – Channel 4, Monday 15th Sept 2006, 9.00pm
On DVD
New York Stories Season 1 - £14.99 at amazon.com 301
303
305

Figure 5

LocateTV [ ]          Embed the latest results for this
                      keyword in your page here

York Minster

Known for the size of the organ, this historic
cathedral was built in 1422. It forms the centre of
the historic city of York in the UK

[Picture] Keyword

501

503

York Minster is keyword in ….

Toast (Film, 128 min, to be released 2006)
The sequel to the acclaimed thriller 'Bread'. Michael York reprises …

Bread (Film, 135 min, 2005)
Ten years on from the seminal Baker movie 'Dough', we find that ….

Fred Dibna's big churches, Episode 2, (2001),
When ever Fred sees a big tower he wants to knock it down, but ….

Songs of Praise, Series 12, Episode 4 (1997)

MyFace.com

Joe Bloggs

My Blog: Update 3rd Sept 2006

Hey y'all, I just saw my favourite episode on "New York Stories", the one where Dirk starts his quest for Penny Black by placing an advert with a dating agency. This show is awesome! If you have not seen this yet what are you doing? (It was on TV last night, maybe they will show it again)

I can see that the existentialist metaphor used in this show has been taken up by the mainstream, but no one got it right like these guys. How does Titmus get that deep questioning worry in his eyes? You tell me! That Penny is a honey.

MyFace.com

Joe Bloggs

My Blog: Update 3rd Sept 2006

Hey y'all, I just saw my favourite episode on "New York Stories", the one where Dirk starts his quest for Penny Black by placing an advert with a dating agency. This show is awesome! If you have not seen this yet what are you doing?                    801

This link will tell you when it is on where you live: www.locate.tv/NewYorkStories/s1e1.htm I can see that the existentialist metaphor used in this show has been taken up by the mainstream, but no one got it right like these guys. How does Titmus get that deep questioning worry in his eyes? You tell me! That Penny is a honey.

701

MyFace.com

Joe Bloggs

My Blog: Update 3rd Sept 2006

Hey y'all, I just saw my favourite episode on "New York Stories", the one where Dirk starts his quest for Penny Black by placing an advert with a dating agency. This show is awesome! If you have not seen this yet what are you doing? I'll help you locate it:

New York Stories, Season 1, Episode 1 (24 min, 1984)
The Penny Black is available in your region LocateTV
Region: UK On TV:
Channel 4, Monday 15th Sept 2006, 9.00pm
US Channel, Monday 16th Sept 2006, 11.30pm To Download:
£1.99 at iTunes.co.uk. Formats supported: MP4. Requires iTunes client.
£1.99 at Channel4.co.uk. Formats supported: WM9. Requires Media Player 9.

DVD: New York Stories Season 1
£14.99 at amazon.com

I can see that the existentialist metaphor used in this show has been taken up by the mainstream, but no one got it right like these guys. How does Titmus get that deep questioning worry in his eyes? You tell me! That Penny is a honey.

LocateTV  [     ]   Embed the latest results for this show in your page here

New York Stories, Season 1, Episode 1 (24 min, 1984)  Show
The Penny Black

Dirk the intrepid stamp collector starts his quest for the elusive Penny Black by placing an advert with the Philatelist dating agency.

Starring: Fred Titmus, Producer: John Smith

Top online discussions for this show 1. www.lastnightontelly.com/nys        1576 hits
2. www.didyouseethat.co.uk/newyorkstories   1289 hits
3. www.nys-blog.com                     875 hits
4. www.welovefred.com                   532 hits
5. www.pennyblack.co.uk                 321 hits

NOW >> Copy the code below

Copy this code and paste it where you wish the embed to appear in your page

2111

```
<a href='http://www.locatetv.com/content.php?id59169'><img src=http://www.locatetv.com/sid59169.gif alt="Click to see LocateTV results for New York Stories S1E1. Always up to date, always relevant to you." border="0"/></a>
```

What's On TV? | Now & Next | Prime Time 7 – 9pm

Click on the TV guide topics on the right to see what's on TV.

Entertainment
Adventure — 2201

Action (16) Adventure (2) Animation (49) Biopic (2) Chat (10) Comedy (67) Crime (26) Drama (56) Fantasy (11) Kids (67) Musical (1) Other (5) Quiz/Contest (23) Reality (36) Romance (4) SciFi (15) Soap (8) Thriller (9) True Life (82) War (8) Western (2)

Trek >> Africa – Lusaka to Livingstone
(Season 1 Episode 17) on – Channel 4 (Ch 104)

8:00pm

Crusades
on – Channel 3 (Ch 103)

9:00pm

Movies — 2203

Action (1) Animation (2) Comedy (7) Crime (6) Drama (9) Fantasy (3) Historic/Epic (1) Horror (1) Musical (2) Romance (3) SciFi (1) Thriller (7) True Life (2) War (2) Western (1)

Sport — 2205

Baseball (1) Combative (7) Cricket (1) Cycling (2) Dogs (2) Extreme (2) Golf (4) Motor (20) Other (17) Rugby (2) Soccer (16) Water (13)

2207

PROVIDING INFORMATION ABOUT VIDEO CONTENT

The present application is a 35 USC §371 application of PCT/IB2008/052941, filed on 22 Jul. 2008 and entitled "Providing Information about Video Content", which was published on 5 Feb. 2009 in the English language with International Publication Number WO 2009/016544 A2, and which relies for priority on US Provisional Patent Application Ser. No. 60/962,546, filed on 30 Jul. 2007.

The present invention relates to a method of and apparatus for providing information about video content to a client.

BACKGROUND OF THE INVENTION

There is an ever-increasing amount of video content available for consumption by end users. Video content is available from an ever-increasing variety of content providers including: broadcast television (TV), video on demand (VOD), downloads from the internet, online retailers (e.g. DVD retailers) etc.

Many internet websites provide details about the availability of TV and other video content including TV listings data and also other relevant data about TV and video content (e.g. synopsis data, series/episode guides, reviews, news, etc.). Many websites are online versions of traditional, printed TV listings magazines, with a focus on presenting TV schedules in an electronic program guide (EPG) grid based format, together with various editorial content. Examples of such sites are www.tvguide.com, www.tv.com and www.radiotimes.com. A website focusing on films/movies is www.IMDb.com.

Many websites are also starting to include links to TV content that is available not only via broadcast TV but also legitimately on the internet. More recently, websites are emerging that include searchable indexes of online video, part of which may be TV content (e.g. www.searchvideo.com, video.google.com, and www.weshow.com. Unfortunately, many of these websites also include links to illegally hosted content.

Meevee (www.meevee.com) is a USA based service that brings together traditional TV listings and online video from hundreds of different sources. MeeVee enables users to personalize content guides in order to discover new programming choices based on their own individual interests. The "Meevee Guide Widget" enables users to share what they are watching on TV with other internet users by allowing the Meevee user to insert a Meevee widget on their own website or blog site. The service currently only works with USA TV listings.

SUMMARY OF THE INVENTION

The present invention, in embodiments thereof, comprises an internet based service, which will hereinafter be referred to as LocateTV. LocateTV allows users of the service to search for and locate video content that is of interest to them, whether the content is available via broadcast TV (e.g. cable broadcast, terrestrial broadcast, satellite broadcast, IPTV broadcast etc.), from a video on demand (VOD) service, from an internet download (e.g. from web sites such as www.itunes.com), on DVD etc.

The results of the user's search are personalized depending on where in the world the user is situated and the time/date of the user's search. The service therefore has permanent relevance—if the content is available, users will be told what options are currently available to them to locate the content.

LocateTV typically supports both the ability to search for content and the ability for users of the service to embed, in third party web pages (e.g. blogs, social networking profiles, etc.), 'always-up-to-date' information about where other people can find selected pieces of content.

According to an embodiment of the present invention, there is provided a method of providing information about video content to a client, the method including: receiving a request from a client requesting information about video content, the request including an internet protocol address of the client; establishing (a) a geographic location of the client from the internet protocol address; and (b) a time of the request; identifying one or more content providers available in the geographic location; in dependence on the one or more content providers and the time, retrieving information about the video content from a database; and providing the information to the client.

In some embodiments, the request includes a request submitted by a user of the client to the client.

In other embodiments, the request includes a request automatically submitted by the client.

In further embodiments, the request is automatically submitted by the client in response to the client parsing a portion of hypertext markup language text.

In some embodiments, the client includes one of a plurality of clients parsing portions of hypertext markup language text when loading websites, and the method further includes: for each website, recording automatic requests received from the plurality of clients in response to the clients parsing portions of hypertext markup language text when loading each website; ranking the websites in dependence on a number of recorded automatic requests; and providing ranking data to the clients in response to a request received from the clients.

In other embodiments, the portion of hypertext markup language text is supplied to the client in response to a previous request received from the client.

In further embodiments, the information is provided in the form of an image.

In some embodiments, the image includes one or more hyperlinks.

In other embodiments, the content providers include television platforms, and the video content includes video content broadcast by at least one television platform.

In further embodiments, the information includes a time at which the video content is next available and a channel on which the video content is next available.

In some embodiments, the video content includes video content available for download from at least one of the one or more content providers via the internet.

In other embodiments, the information includes one or more links to websites of the content providers from where the video content can be downloaded.

In further embodiments, the information further includes costs of downloading the video content from the websites.

In some embodiments, the video content includes video content available to purchase as recorded media from at least one of the one or more content providers.

In other embodiments, the information includes one or more links to websites of the content providers from where the recorded media can be purchased.

In further embodiments, the information further includes costs of purchasing the recorded media from the websites.

In some embodiments, the method further includes providing related information to the client if information about the video content is not available, wherein the related information includes related information about related video content related to the video content.

In accordance with other embodiments of the present invention, there is further provided apparatus for providing information about video content to a client, the apparatus including: means for receiving a request from a client requesting information about video content, the request including an internet protocol address of the client; means for establishing (a) a geographic location of the client from the internet protocol address; and (b) a time of the request from the request; means for identifying one or more television platforms available in the geographic location; means for retrieving information about the video content from a database in dependence on the one or more television platforms and the time; and means for providing the information to the client.

BRIEF DESCRIPTION OF THE DRAWINGS

The present invention will be understood and appreciated more fully from the following detailed description, taken in conjunction with the drawings in which:

FIGS. 1 to 11 are simplified pictorial illustration screen shots that a user might see when accessing a service operated in accordance with embodiments of the present invention;

FIG. 14 is another simplified pictorial illustration screen shot that a user might see when accessing a service operated in accordance with embodiments of the present invention; and FIGS. 15 to 22 are simplified pictorial illustration screen shots that a user might see when accessing a service operated in accordance with further embodiments of the present invention.

DETAILED DESCRIPTION OF EMBODIMENTS

Figure 13:
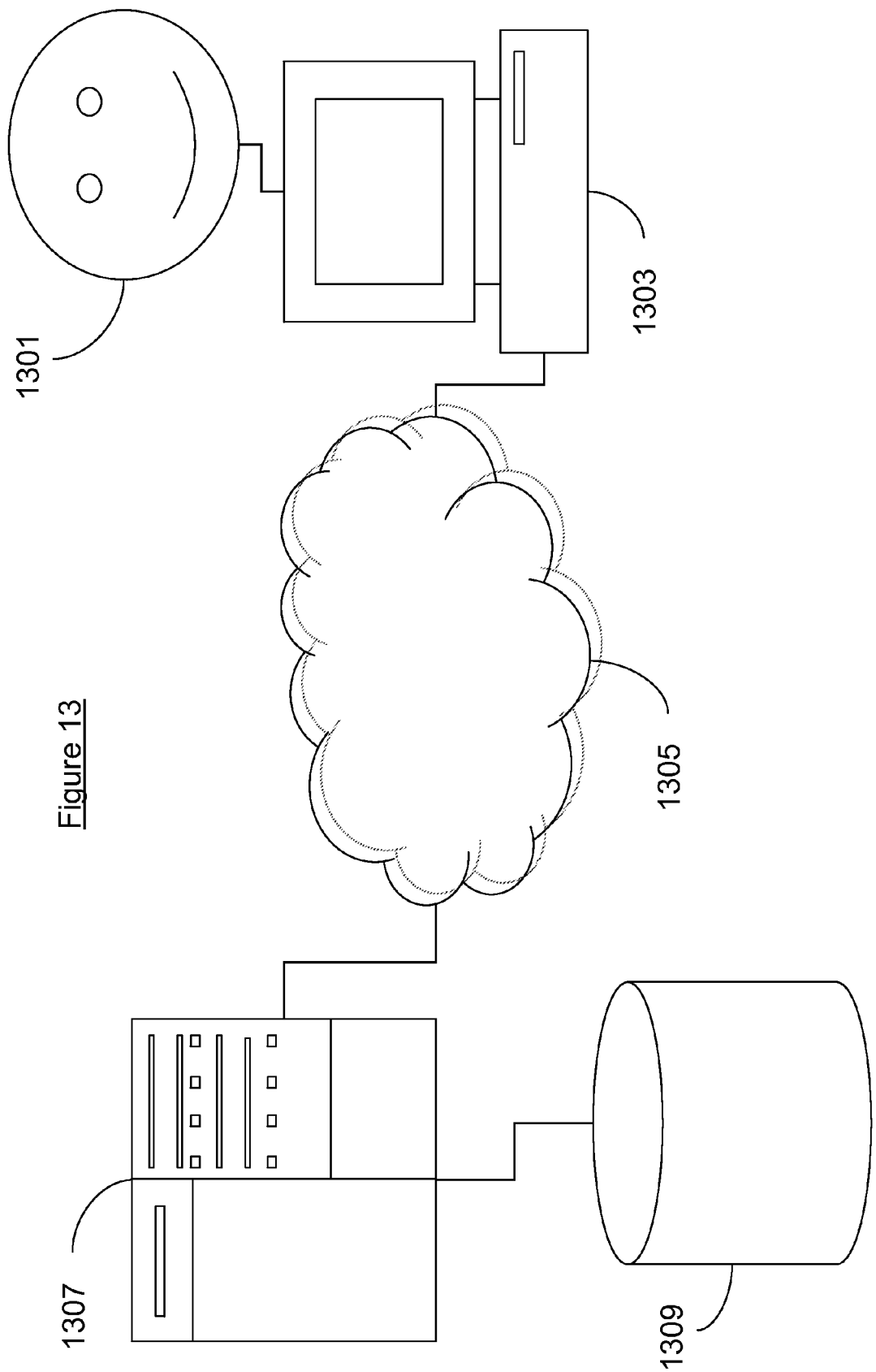
FIG. 13 is a simplified pictorial illustration of a system constructed and operated in accordance with embodiments of the present invention.

Referring first to FIG. 13, a user 1301 is shown having access to a computer 1303 (e.g. a client PC) that is connected to the internet 1305. The user uses internet browser software installed on the computer 1303 to browse the internet 1305 and to navigate to the LocateTV website.

The website associated with the LocateTV service comprises a domain-specific search site; the domain being video content and more specifically video based content suitable for broadcast on television (e.g. TV shows, documentaries, films etc.). As mentioned previously, the search results provided to the user include 'always up-to-date' location information about where to find the content based on the time of the user's search and the user's location in the world.

Also connected to the internet is the LocateTV server 1307 which itself is in operative association with the LocateTV back-end database 1309. The LocateTV server 1307 receives search requests from users such as user 1301, queries LocateTV database 1309 and returns the results to the user. Searches submitted by users using the LocateTV website are conducted using the LocateTV back-end database 1309. The LocateTV back-end database 1309 comprises descriptive metadata and availability information for video content. Such metadata and availability information is, for example, sourced from metadata aggregators (e.g. Tribune Media Services, IL, USA; FYI Televisision Inc., TX, USA; The Press Association, London, UK; RedBee Media Broadcasting Dataservices, London, UK; etc.); derived from third party internet feeds using mechanisms such as RSS or web service APIs (e.g. Netflix, who make a range of RSS feeds available, for example new DVD releases available to rent, see www.netflix.com/RSSFeeds; Amazon who make an e-commerce Web Service API available to enable affiliates to link to items in the Amazon catalogue & generate affiliate revenue on Sales, see aws.amazon.com; price comparison shopping services such as PriceGrabber.com offer data feeds to enable products and offers to be displayed on partner web sites; etc.); scraped/crawled from web pages; etc. It is possible that the data stored in the back-end database is supplied from more than one source. Where data is supplied from multiple sources (possibly by different mechanisms), it is typically stored in the back-end database as an aggregated, single, coherent dataset. Methods of aggregating data from multiple databases (in particular those built on top of standard database technology (e.g. SQL, Oracle etc.) will be apparent to someone skilled in the art.

In the description of the LocateTV website that now follows, a set of web pages presented to the user as they search for TV content and explore the search results will now be described as an example.

Figure 1:
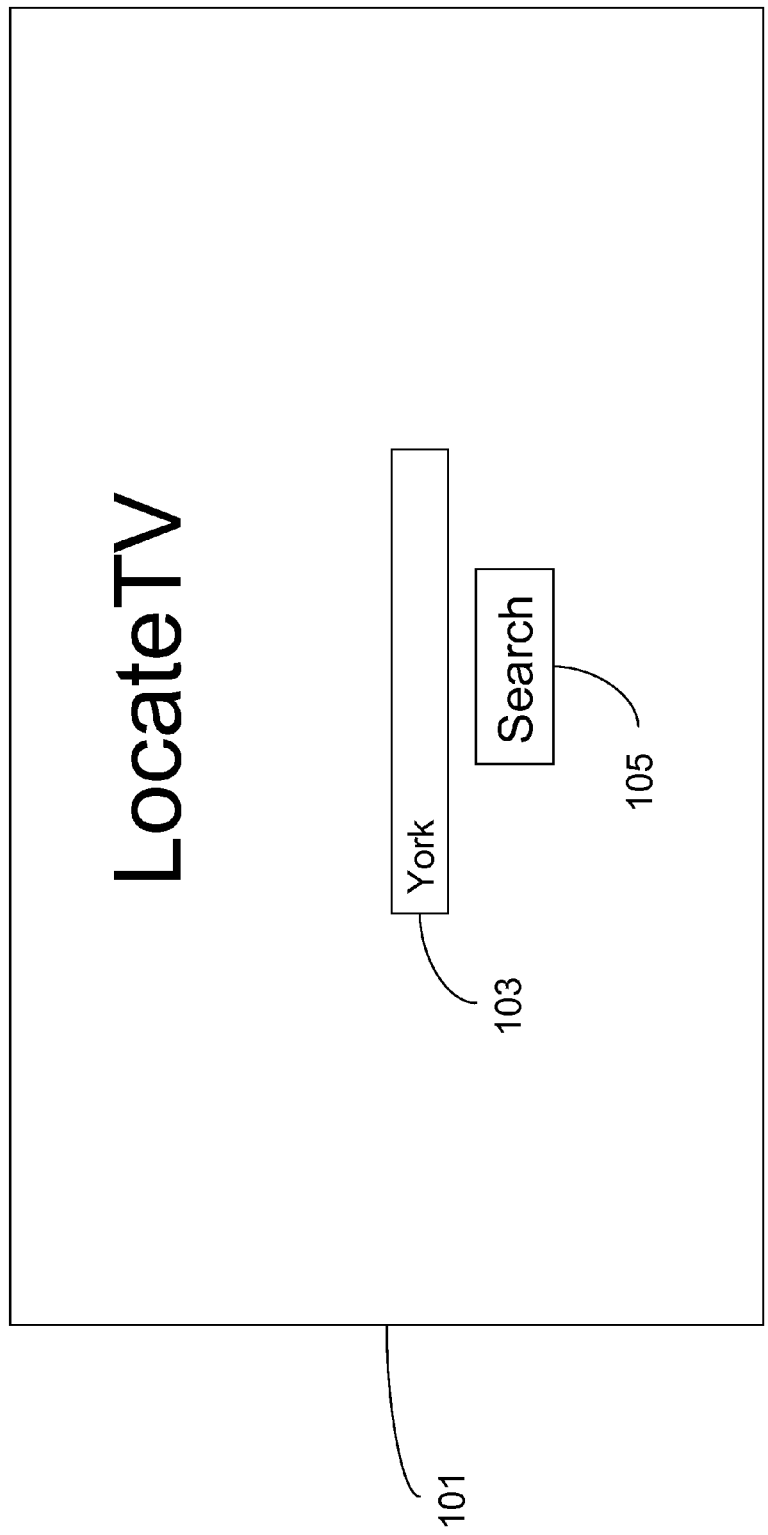

Referring first to FIG. 1, a simple search page 101 is shown, which provides users access into the LocateTV service. Users are able to enter free text into a search box 103 and will then initiate the search by clicking on the search button 105. In the example shown, a user has entered the word 'york' as a search term. The search itself is typically carried out over multiple metadata fields within the LocateTV back-end database, for example (but not limited to) title, keywords and talent (such as actors, actresses, producer, director, production crew, etc.).

Figure 2:
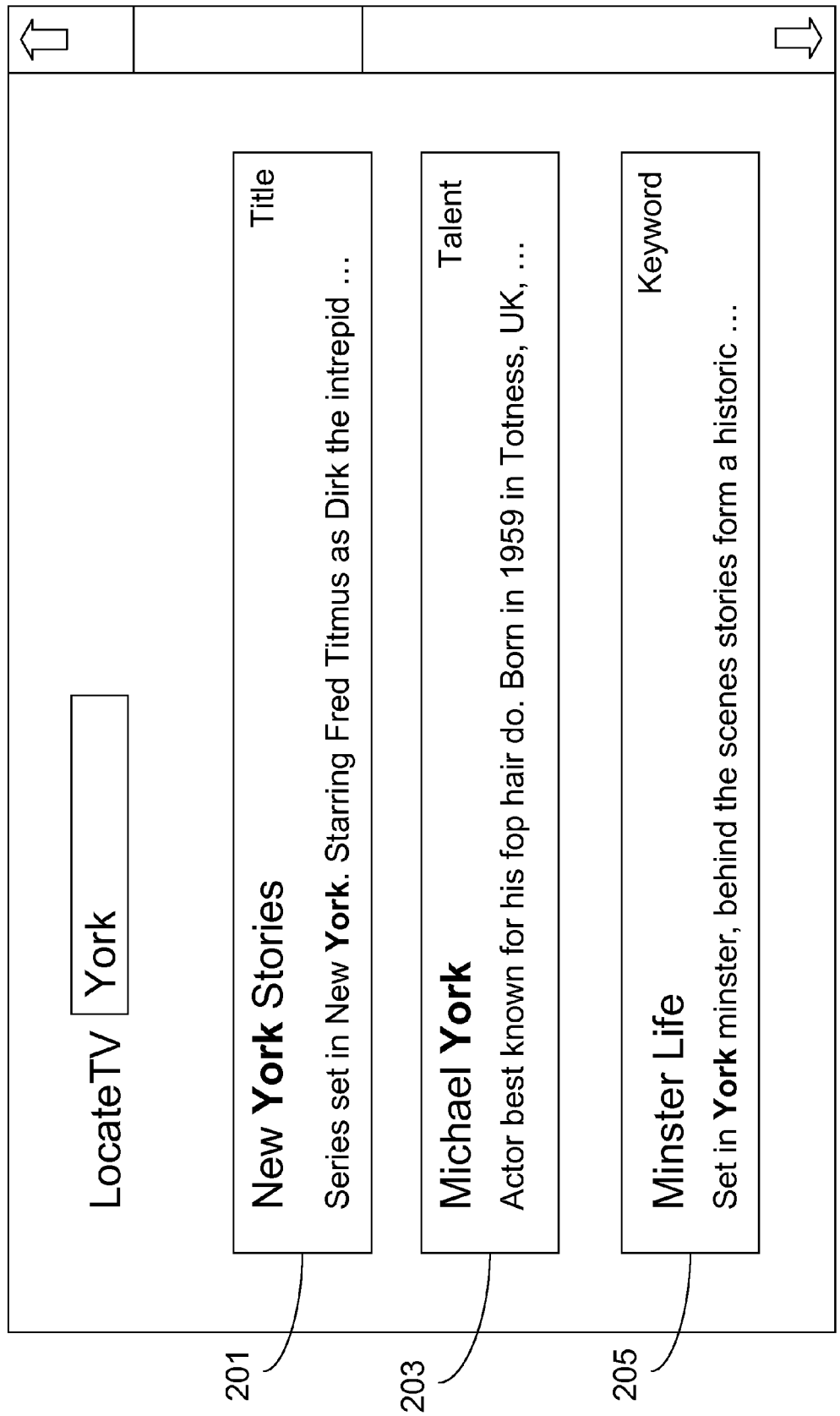

FIG. 2 shows the search result summary page for the LocateTV search of "York" as described above in relation to FIG. 1. Search results that match by title 201, talent 203 and keyword 205 are shown. Each of the search results presented typically includes a hyperlink that the user can click on in order to navigate to a webpage that would show the selected search result in more detail.

FIG. 3 shows an information page for a series called "New York Stories" that a user can access by clicking on search result 201 as described above in relation to FIG. 2. The page comprises some synopsis and talent information 301 as well as episode information 303 appertaining to individual episodes of the series. Similar to the search results, each of the episodes listed in episode information 303 typically includes a hyperlink that the user can click on in order to navigate to a webpage that would comprise more information about the selected episode. The page also typically includes 'always up-to-date' locate information 305 for the selected series. More details about locate information will be provided below.

Figure 4:

FIG. 4 shows an information page for an actor (an example of 'talent') called "Michael York" that a user can access by clicking on search result 203 as described above in relation to FIG. 2. The page comprises some more detailed information 401 appertaining to the selected talent, optionally including a picture/photograph 403 of the selected talent. The page also comprises some synopsis information 405 for content that the selected talent has appeared in. If available, locate information for the content is also provided. Similar to the search results, each of the content items listed in synopsis information 405 typically includes a hyperlink that the user can click on in order to navigate to a webpage that would comprise more information about the selected content item.

FIG. 5 shows an information page for "York Minster" that a user can access by clicking on search result 205 as described above in relation to FIG. 2. It will be remembered that search result 205 comprises a keyword search result and is provided because the word "york" (the search term entered by the user)

matches one of the entries in the back-end database. The page comprises some more detailed information 501 appertaining to "York Minster", optionally including a picture/photograph 503. The page also comprises some synopsis information 505 that includes "York Minster". Similar to the search results, each of the content items listed in synopsis information 505 typically includes a hyperlink that the user can click on in order to navigate to a webpage that would comprise more information about the selected content item. If available, locate information for the content items is also provided. Typically, stemming is also supported in the keyword search functionality e.g. a search for the word "paraglide" would yield search results including the words "paraglider", "paragliding", etc.

Figure 6A:
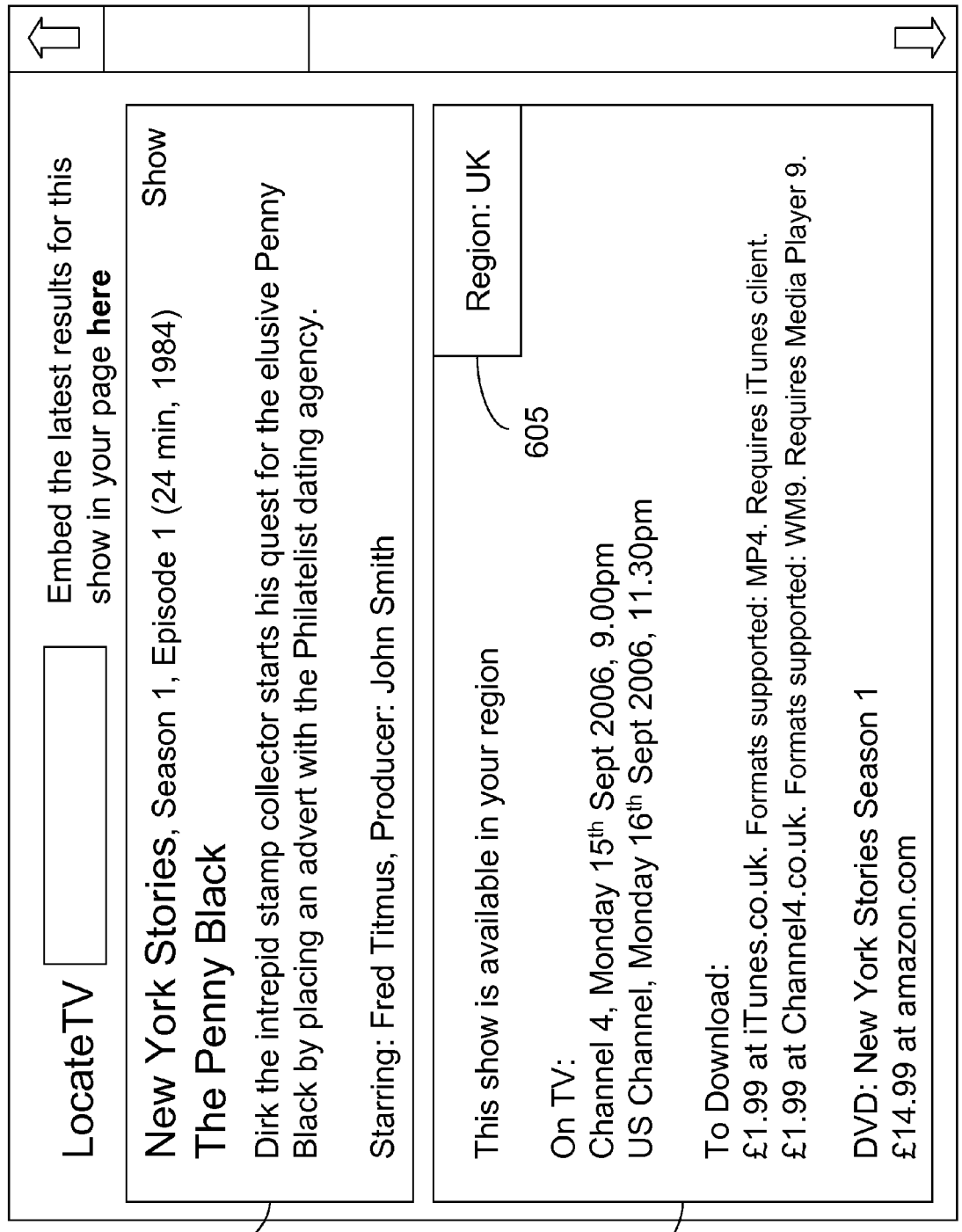

FIG. 6a shows an information page for a particular episode of a series, in this case "New York Stories, Season 1, Episode 1", that a user can access by clicking on an episode information hyperlink within episode information 303 as described above in relation to FIG. 3. The page comprises some synopsis and talent information 601 as well as the 'always up-to-date' locate information 603 for the selected episode.

The locate information 603 presented to the user is relevant to the user's region, which is typically clearly indicated in the search result by region information 605. In the page shown in FIG. 3, the user is presented with locate information 603 relevant to the UK. The locate information 603 shows all the locations where the user can locate the selected episode, including, but not limited to, TV schedules, internet downloads and from a DVD retailer. Typically, each of the links to internet download websites or online retail websites comprises a hyperlink that the user can click on in order to navigate directly to the page on that website for the selected episode.

Figure 6B:
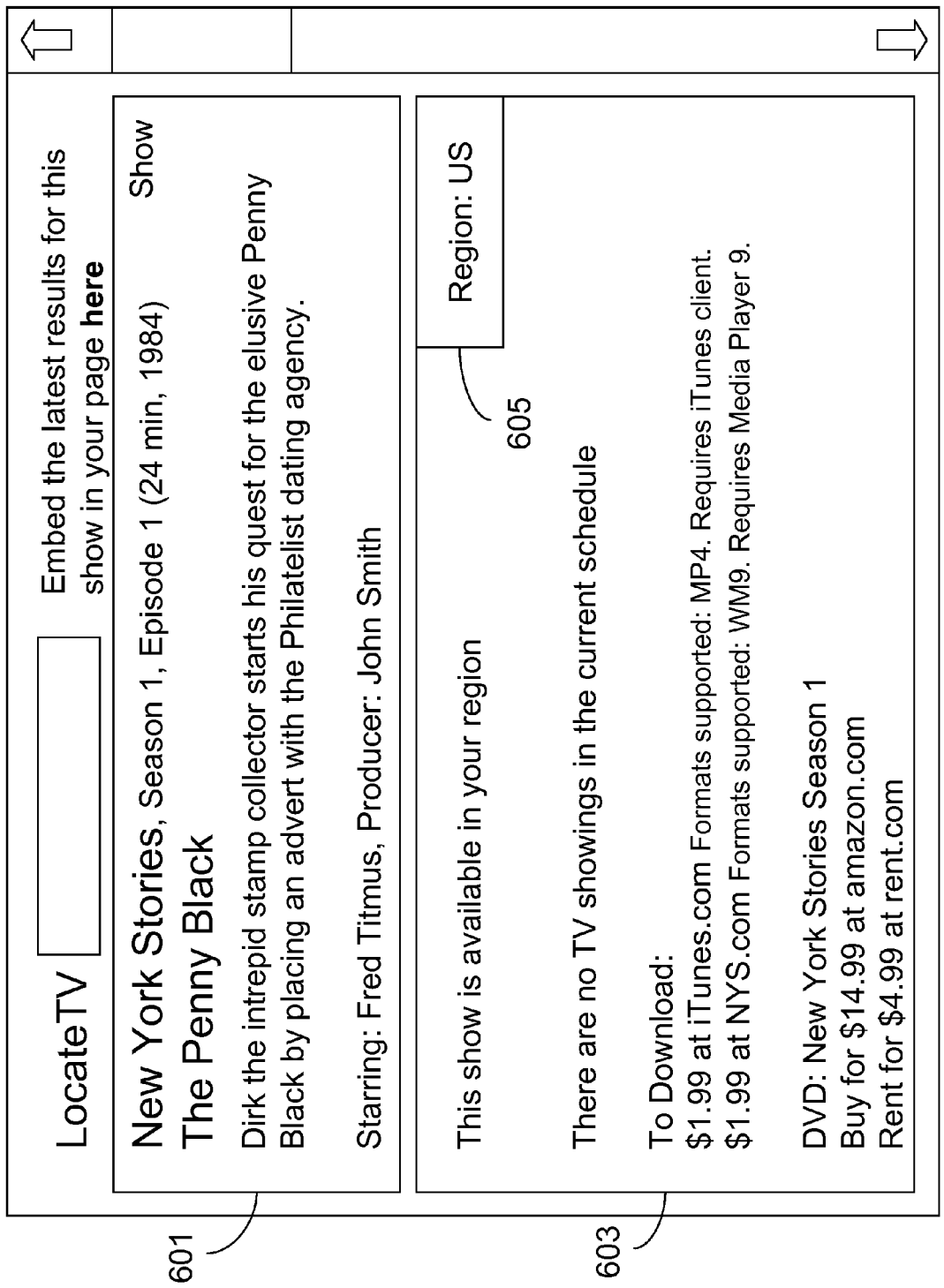

FIG. 6b also shows an information page for "New York Stories, Season 1, Episode 1" but differs from the page described above in relation to FIG. 6a because the locate information 603 is relevant to a user based in the US rather than the UK. In this case, the selected episode is not available via a TV broadcast but other locations from where the user can obtain the selected episode are listed.

Deriving the region of the user can be done by several methods. A first method relies on the provision of a database that relates public internet protocol (IP) addresses to physical locations (for example, zip or postal codes). Such databases are commercially available from vendors such as Max-Mind®, MA, USA & Quova, CA, USA. Using such a database, when a user accesses the LocateTV website, the user's likely geographical location can be estimated by LocateTV server 1307 from the user's computer's IP address, which is supplied as part of the HTTP request made from the browser installed on the computer and received at the back-end database when the user accesses the LocateTV website. Once a user's location has been estimated, content providers available in the estimated user location can also be determined. The location information for content that is provided to the user can be filtered such that only location information relevant to the user's location (and optionally content provider) is provided, e.g. local TV stations, local online services, local DVD retailers, etc. The user request is also typically used to establish the time zone that the user is in, and the current time (i.e. the time that the request was received from the user). The broadcast schedule results presented to the user can then be expressed in the user's local time, and TV programs that have already been broadcast can be excluded from the location information.

In a second method, the user can provide personalization information including, but not limited to, information about their location, preferred TV platform, preferred online services, preferred online retailers. This enables the search results served to the user to be further filtered.

In both the cases described above, information about a user's location can be stored on the user's computer (e.g. using a LocateTV cookie) so that the location information data can be retained across multiple visits/sessions to/on the LocateTV website.

In embodiments of the present invention, locate information can be made available for users to include in their own websites and ways of doing this will now be described.

It is increasingly common to find people writing about video content and TV shows on the web. This includes writing about video content on commercial or personal websites sites, on social networking websites such as Orkut, Facebook, MySpace, etc., on blogs, in posts to online forums, in emails etc. FIG. 7 shows an example of a webpage 701 that makes reference to a show. A similar entry might be made on a social network website, as a post to an online forum, as an email etc.

Often, the writing will be related to the content of a particular show but it is also common to use the writing to alert other people to an upcoming showing of a particular piece of video content. Hence it is highly desirable to allow people to include LocateTV search results (which, it will be remembered are always up-to-date and relevant to the region of the reader and the time at which the reader looks at the search results) in their writing.

Two ways to include LocateTV search results in third party webpages will now be described.

In some embodiments of the present invention, a link to the relevant LocateTV page for a selected content item can be included. FIG. 8 shows the inclusion of a link 801 in the example page 701 of FIG. 7. The link would take the reader to the page of FIG. 6a or FIG. 6b (depending on the region of the reader), which therefore would include the always up-to-date locate information relevant to that reader at that time.

In alternative embodiments of the present invention, the LocateTV search results can be embedded directly into the third party webpage. FIG. 9 shows LocateTV results embedded into the example page 701 of FIG. 7. The embedded LocateTV results 901 are not static text, but results that are always up to date with locate information relevant to that reader at that time. The process of generating the embedded LocateTV search result and rendering always up-to-date locate information to the reader will be described in more detail below.

Figure 10:
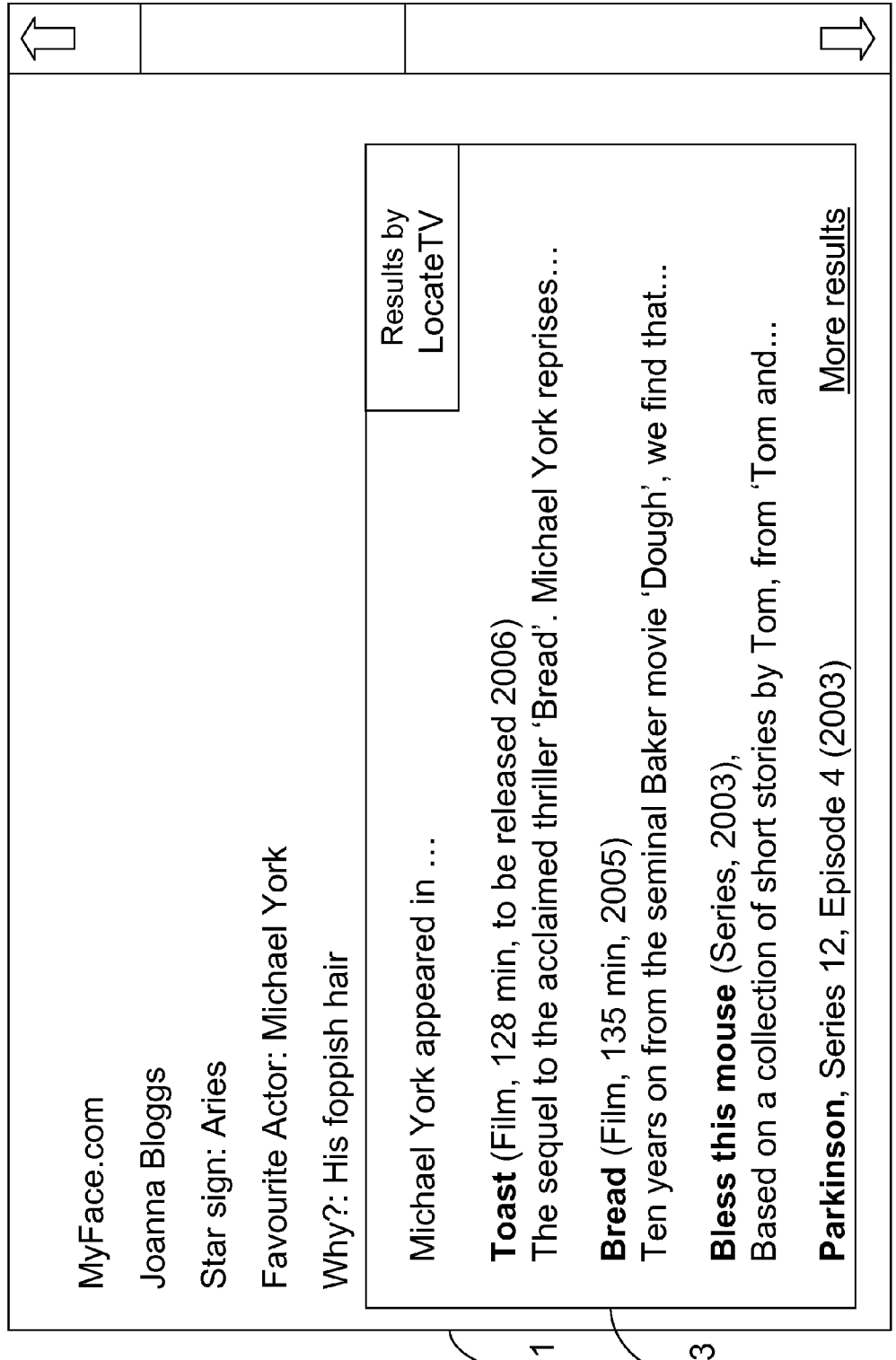
Figure 11:
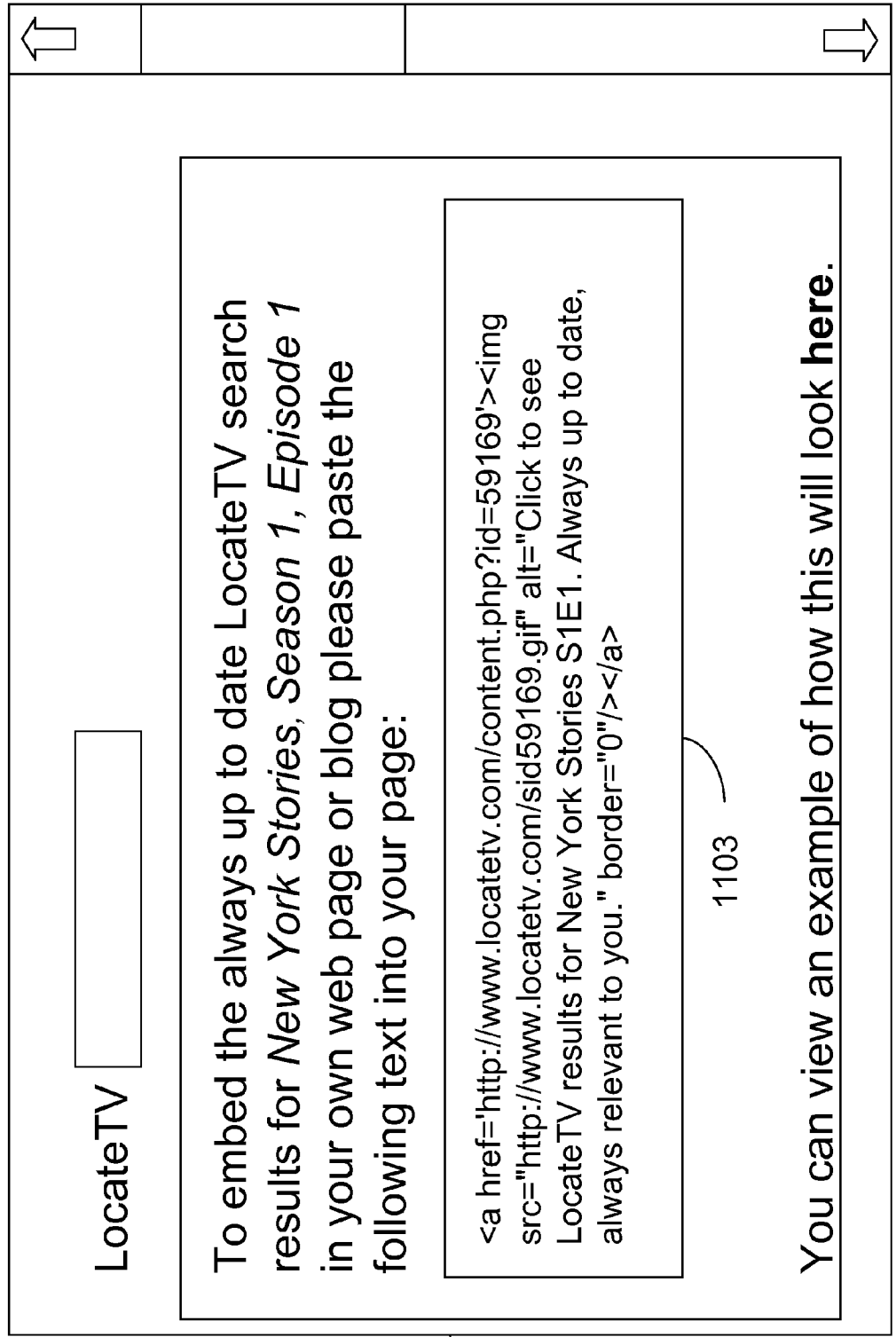

FIG. 10 shows an example where the LocateTV search results for an actor's most recent shows have been embedded into a third party webpage 1001. As before, the embedded LocateTV result 1003 is up-to-date. In the example of FIG. 11, the shows that the actor has appeared in are presented in chronological order with reference to the date of release. In alternative embodiments, the results may be presented in the order of when upcoming showings will be made on TV.

FIG. 3, FIG. 4, FIG. 5, FIG. 6a and FIG. 6b—the example LocateTV search result pages described above—all include the option to embed the latest results for this series, talent, keyword or show in a third part webpage. Typically the option includes a hyperlink that the user can click on in order to navigate to a webpage that would comprise more information about how to embed the selected series, talent, keyword, show etc. in a third part webpage. In the examples of FIG. 3, FIG. 4, FIG. 5, FIG. 6a and FIG. 6b, the word "here" includes the hyperlink that the user can click on.

FIG. 11 shows an instruction page 1101 comprising embed instructions (for how to embed LocateTV results into a third party webpage) that the user can access by clicking on the option to embed the search results in a third party webpage. The user is instructed to paste some HTML mark-up 1103 into the third party webpage into which they want to embed the LocateTV search results. In the example shown, the HTML mark up enables a user to add an embedded image (or image-based embed) to a third party webpage (e.g. the user's blog). After navigating to the third party webpage but before the third party webpage is actually rendered in the viewer's internet browser, a request is sent to the LocateTV server, which requests the embedded image to render. When a viewer subsequently views the third party webpage, the viewer will see an embed with locate information that is personalized to them (i.e. the viewer). On selecting (e.g. clicking-on) the image-based embed, the viewer is typically directed to the LocateTV website to see where the content of interest can be located.

In the present embodiment, an image-based embed is used. Using an image-based embed is advantageous because images are generally a 'lowest common denominator' of embeddable content that most websites, blogs & online forums will not filter out (e.g. for security reasons). It is to be noted that the actual embedded data could, in alternative embodiments, be based on a variety of other formats, for example, HTML mark up (using I-Frame tags), images (for example but not limited to BMP, GIF (including animated GIF), JPEG, PNG (& MNG) formats), interactive formats such as SVG or Adobe Flash, internet video clips, etc.

The process of determining and rendering the region dependent, time dependent, up-to-date content of an image-based embed will now be described by way of an example.

User A embeds a LocateTV content search result into their blog. User B then browses User A's blog page. On loading User A's blog page, User B's internet browser parses the embed HTML mark up that User A has pasted into their blog page causing it to submit a request for the embed image from the LocateTV server.

On reception of the embed image request, the LocateTV server first establishes the location of User B (or establishes a 'best guess' estimate for the location of User B), using the cookie and/or IP lookup mechanisms described above.

Having established or estimated the location of User B, the LocateTV server then queries the LocateTV back-end database in order to establish the availability of the content for User B, based on the location of User B and the time/date User B browses User A's blog page.

Typically, the embed image has a predetermined maximum size—if it were too large it would be unacceptable to users—and therefore a series of simple rules are then typically followed, based on the content type and the content availability options for User B, in order to determine what information will be rendered in the embed image.

Figure 12:
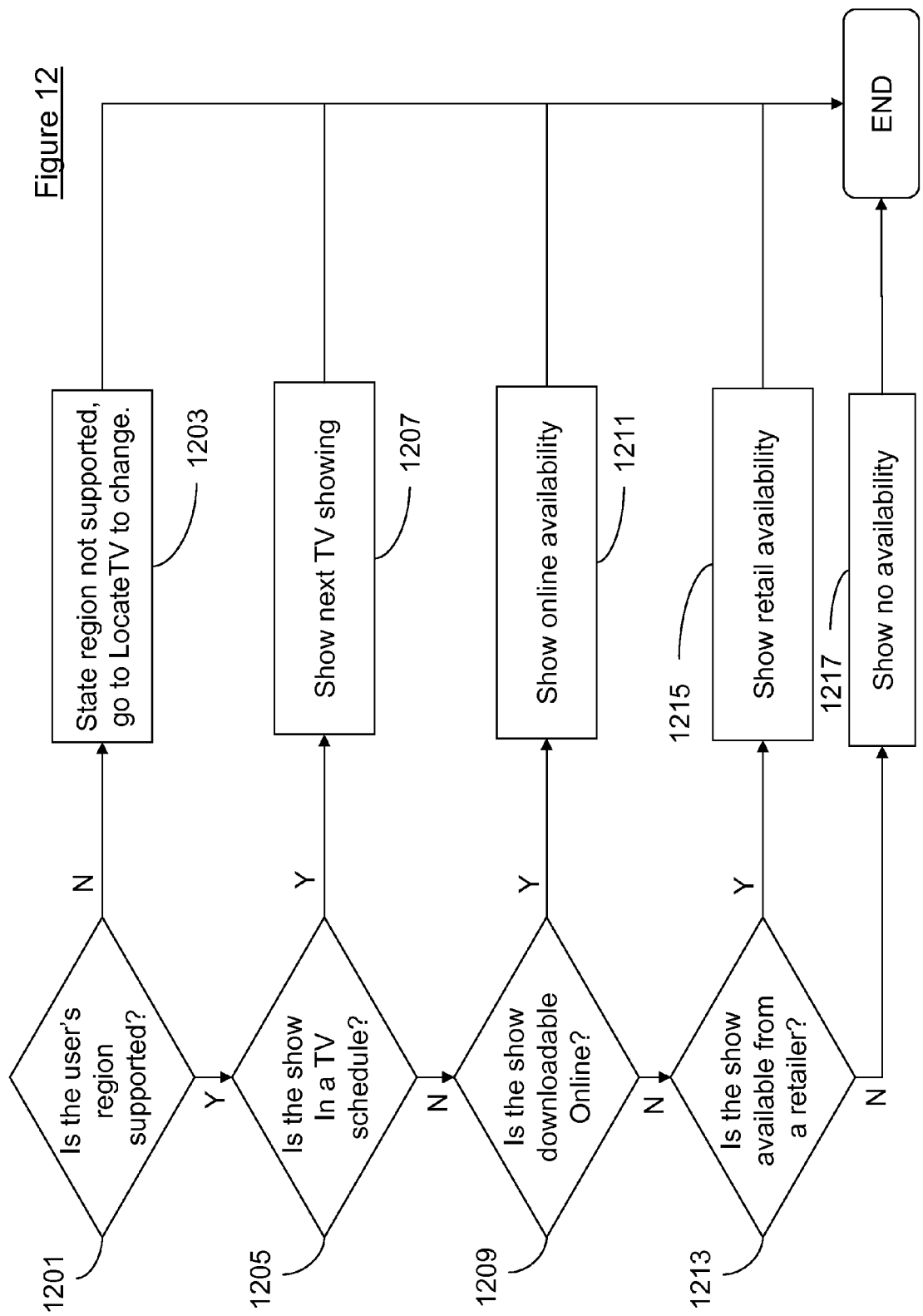
FIG. 12 is a flow chart illustrating a method to decide which content to include in an embed according to embodiments of the present invention.

Referring now to FIG. 12, the rules for video content will now be described.

In a first step 1201, the LocateTV server first checks that the region it has established/estimated is supported by the LocateTV service. If the region is not supported then User B will be informed (step 1203) that the region is not supported. Typically, User B will also be informed that they can go to the LocateTV website in order to change their region setting (e.g. User B might be located in a region not supported by LocateTV but may be interested in seeing LocateTV search results for a region that is supported by the LocateTV service). An example message displayed to User B might be "Sorry, your geographic region is not currently supported by our service. Please visit LocateTV to change your region".

If the region is supported then the LocateTV server checks (step 1205) whether or not the video content is available in the TV schedules associated with the established/estimated (and supported) region. If the video content is available in an associated TV schedule, schedule information related to the next showing of the video content in the associated TV schedule is returned to the image-based embed rendering process (step 1207).

If the video content is not available in an associated TV schedule, the LocateTV server checks (step 1209) whether or not the video content is available to download from an online source associated with the established/estimated region. If the video content is available from an associated online source, download information related to the online source and the availability of the video content online is returned (step 1211) to the image-based embed rendering process.

If the video content is not available from an associated online source, the LocateTV server checks (step 1213) whether or not the video content is available to buy from an online retailer (e.g. on DVD) associated with the established/estimated region. If the video content is available from an associated online retailer, retail information related to the online retailer(s) and the availability of the video content from the online retailer(s) is returned (step 1215) to the image-based embed rendering process.

If the video content is not available from an associated online retailer, then User B will be informed (step 1217) that the video content is currently unavailable in the established/estimated region.

Alternatively, if the video content is not available in a TV schedule, for download or from an online retailer, User B may be informed that the video content is currently unavailable in the established/estimated region but related video content is available. Related video content might, for example, have a cast or crew member in common with the unavailable video content; or may be an episode from the same series as an unavailable episode; or may be another season of an unavailable series. Other methods of suggesting related content to User B will be apparent to someone skilled in the art.

Similar rules can be applied in the case of talent associated with a piece of video content except that steps 1205, 1209 and 1213 would be replaced by the following checks: "Is the talent associated with a show in the TV schedule"; "Is the talent associated with an online downloadable show"; and "Is the talent associated with a show that is available from an online retailer".

Having determined the content for the embed and therefore the information to render in the embed according to the above described rules, the LocateTV processor uses this information to render the image-based embed. The embed rendering uses a default background image that is pre-rendered for every image-based embed. On to the default background, the information for the specific details of the embed is rendered using a graphics library that includes text rendering support (e.g. ImageMagick® www.imagemagick.org). Once the final image is rendered, it is transmitted to User B's browser for display in User A's blog.

In this way, the image-based embed that is rendered is composed by the LocateTV server in real time and the information provided in the embed is region dependent, time dependent, platform dependent and up-to-date.

Thus if a User C were to visit User A's blog and User C was based in a different region to User B, the embed rendered for User C would be different to the one rendered for User B.

Moreover, if a User D were to visit User A's blog a month after User B visits User A's blog, then the embed rendered for User D might be different to the one rendered for User B even if User D was based in the same region as User B.

Furthermore, if a User E were to visit User A's blog and User E subscribed to a different TV platform to User B, then the embed rendered for User E might be different to the one rendered for User B even if User E was based in the same region as User B and visited User A's blog at the same time and on the same day as User B.

For third party webpages where users have chosen to embed LocateTV results as described previously, every time the third party webpage is accessed, the LocateTV service serves an up-to-date embed into that third party page as described above. In serving the embed, the referring URL (i.e. the website address of the third party webpage) is known to the LocateTV server from the referrer field in the HTTP request. The LocateTV server can therefore present for the content which is embedded, a further webpage on the LocateTV website that provides details of all of the third party webpages that have an embed for that content. By counting the number of embeds served to each third party webpage, the LocateTV server can also rank the third party webpages in terms of popularity, i.e. the third party webpage that is visited the most will send the most embed render requests to the LocateTV server and could be ranked as the most popular third party website in relation to that content. In this way, webpages where users are discussing content can be linked together and can be presented on the LocateTV website. FIG. 14 shows an example discuss information webpage 1401 that shows synopsis and talent information 1403 for "New York Stories, Season 1, Episode 1" as well as discuss information 1405—a list of third party websites having an embed for "New York Stories, Season 1, Episode 1" and ranked in order of the number of times the LocateTV server has served an image for the embed on that particular third party website.

In the above description of the LocateTV website, a set of web pages presented to the user as they search for a TV show and explore results was described as an example. Since these web pages are generated using the data stored in the back-end database, it will be appreciated that a range of alternative webpage layouts and ways of presenting information to the user are possible—for example, the schedule of the next episode of a series could be presented for each series at the search result summary level.

Different graphics to those described above could be used to illustrate where a user is in the LocateTV website. For example, a parent-child relationship between a series and episodes could be shown in graphical form.

Relevant links could be provided in the search results to other third party, external sites that contain more information on the shows or talent, including, for example, www.wikipedia.com, www.imdb.com, a show's official website/blog etc.

All information throughout the LocateTV website is typically cross linked to enable easy navigation to points of interest. For example, in the synopsis information, clicking on a particular talent typically takes the user to the information page for the selected talent. Any keyword in the synopsis information is also clickable.

In addition to the use of a personal computer (PC) running a web browser, the LocateTV website could also be accessed by a user using a mobile device (e.g. a mobile telephone, a smartphone, a portable digital assistant (PDA), etc.) as well as a set top box (STB) running its own onboard web browser.

The search results may also include links enabling a user to schedule a recording of the content (e.g. from a TV broadcast) on a video recorder (e.g. a digital video recorder (DVR)).

Additional embodiments of the present invention will now be described in relation to FIGS. 15 to 22.

Legitimate television content is available from an ever changing list of sources depending on where a particular television view lives—on broadcast television, online and on different recorded media. A challenge is to collate all this information together so that television viewers from different geographic locations can search for and find the same content.

According to embodiments of the present invention, LocateTV lets television viewers find television shows available where they live in the world, be they on broadcast TV, online or on recorded media (e.g. DVD). Additionally, LocateTV provides tools to assist contributors to the internet. For example, if an internet contributor wants to recommend a TV show, movie or actor in a blog, the internet contributor can use an embed service according to embodiments of the present invention in order to provide an easy way to let readers of the blog know where and when the recommended content can be found. Placing an embed makes it easier for readers of the blog to find out where and when to view the content in the reader's region. Moreover, the embed will always be up to date with the latest information.

Figure 15:
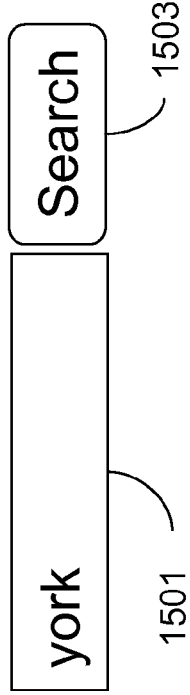

Referring now to FIG. 15, a viewer wanting to search television listings can navigate to the LocateTV homepage on the internet and type the name of a TV program, a movie, an actor or somebody in the credits (e.g. producer, director etc.) into search box 1501 and then click the search button 1503. In alternative embodiments, a viewer can also type in a keyword. The viewer can also enter partial names or titles as illustrated in FIG. 15 where a viewer has entered the word "york".

LocateTV automatically detects the geographic region of the viewer who submits the search so that listings appropriate for that geographic location can be provided to the viewer. This is achieved in the present embodiment by using a database that relates public internet protocol (IP) addresses to physical locations (for example, zip or postal codes) as previously described. LocateTV also allows the viewer to provide personalization information including, but not limited to, geographic location information and preferred TV platform, as previously described. In the absence of any personalization information, LocateTV provides listings appropriate to all TV platforms available in the calculated geographic location.

Figure 16:
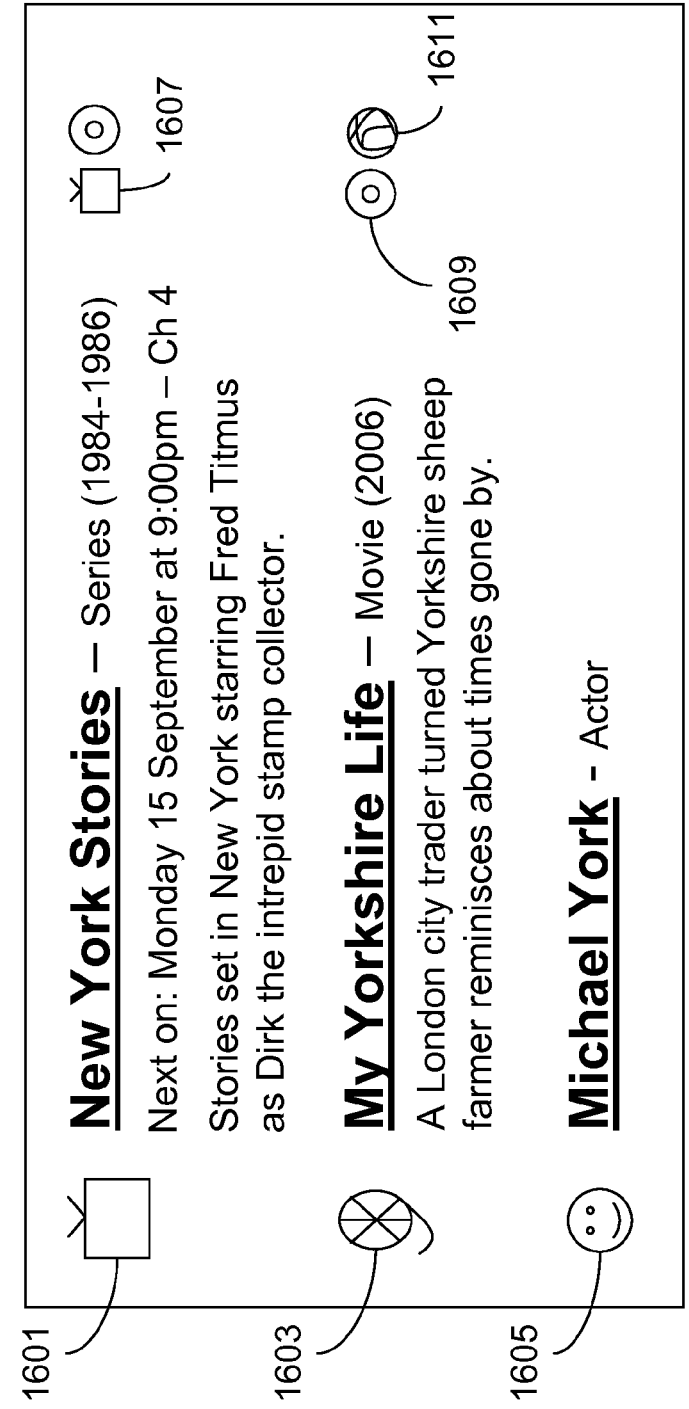

LocateTV then performs the search and lists all the matching programs and/or people including information about when and where the viewer can watch matching programs in a predetermined time period forward from the time of the search request (e.g. within the next two weeks) for the viewer's geographic location and TV platform. This is illustrated in FIG. 16 where three search results are returned in response to the search for "york": a television series "New York Stories" 1601; a movie "My Yorkshire Life" 1603; and an actor "Michael York" 1605. Icons in the search result list also indicate where a TV program can be found: available on TV icon 1607; available on DVD icon 1609; and available online icon 1611. Typically, the viewer can get summary availability information by hovering a pointer over the top of one of the icons in order to display a small summary window (not shown).

Typically, the search results are underlined to indicate to the viewer that the search results are clickable in order to navigate to a program details page where more detailed information is available about a selected search result.

Figure 17:
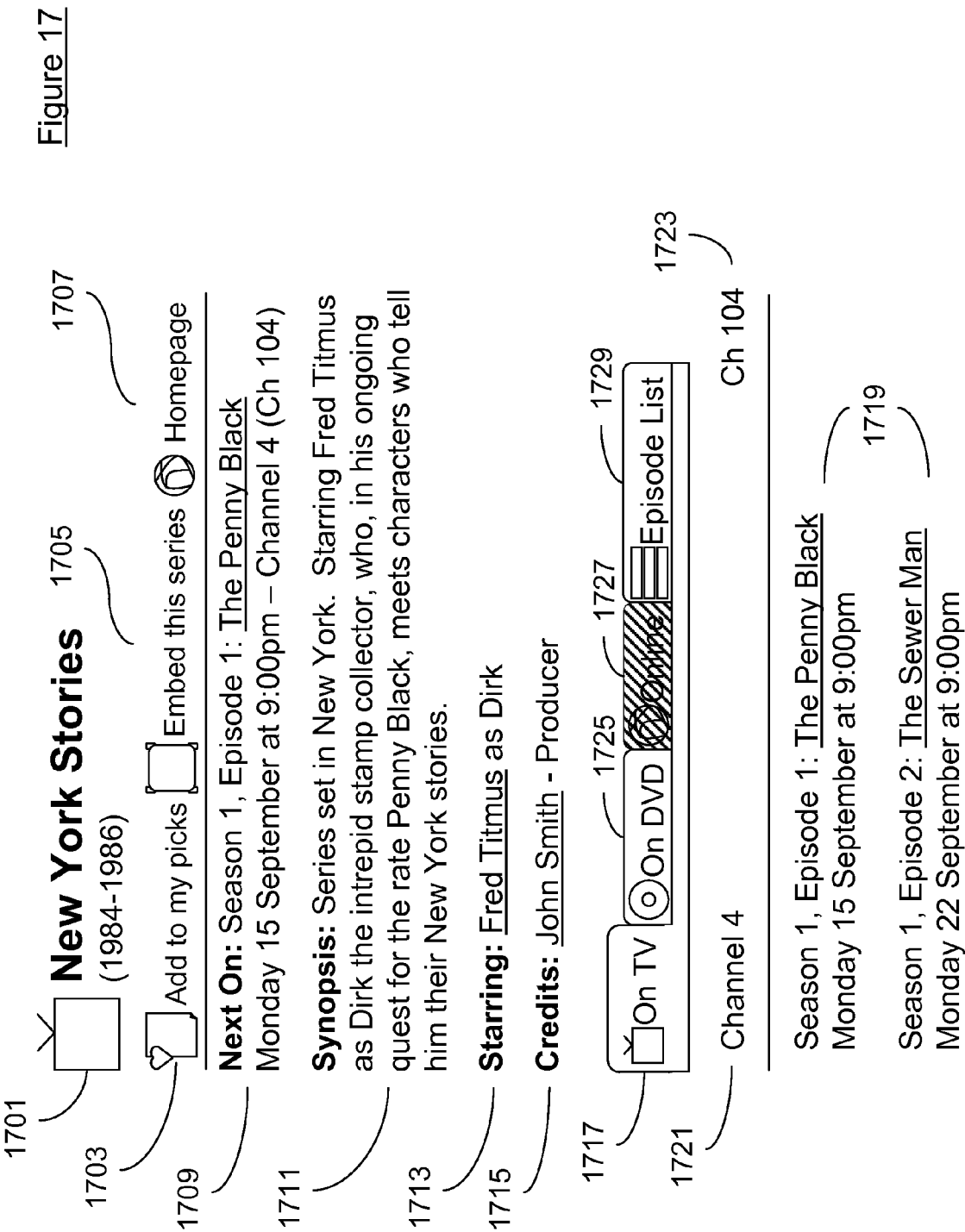

Referring now to FIG. 17, the program details page for the television series "New York Stories" 1601 search result will now be described in more detail. The title 1701 of the TV show is shown at the top of the program details page. Below the title 1701 are three selectable options: add to my picks 1703; embed this series 1705; and homepage 1707. The functionality associated with the add to my picks 1703 and embed this series 1705 options will be described later. Homepage 1707 option allows the viewer to visit the internet homepage of the selected TV show.

Next on information 1709 is shown below the three selectable options 1703-1707 and comprises information about when and where the viewer can next watch an episode of the selected TV show in a predetermined time period forward from the time of the search request (e.g. within the next two weeks) for the viewer's geographic location and TV platform. The details of which episode is available to view next (e.g. Season 1, Episode 1) is also provided as well as the title of the episode ('The Penny Black'). The title of the episode is underlined indicating that it can be selected. If the viewer selects the episode title, then the viewer will navigate to a program details page specific to the selected episode of the TV show, an example of which can be seen in FIG. 18, which will be described in more detail below.

Below next on information 1709 is a synopsis 1711 of the TV series. Below synopsis 1711 is starring information 1713, which gives a list of actors appearing in the TV series and the characters they portray. Typically, actors' names are underlined indicating that they are selectable for more information about the selected actor on a people details page. A people details page (not shown) lists other TV shows and movies that the actor has starred in. If any of these other TV shows or movies can be viewed in a predetermined time period forward from the time of the search request (e.g. within the next two weeks) for the viewer's geographic location and TV platform, details are provided next to the name of the other TV show or movie. In this way, a viewer can use an actor details page to find out the next time they can watch a particular actor in the viewer's geographic location.

Below starring information 1713 is credits information 1715, which gives a list of other people credited in the TV series and the role they played (e.g. director, producer, sound engineer etc.) Typically, credited peoples' names are underlined indicating that they are selectable for more information about the selected credited person on a people details page, as described above in relation to actors.

Below credits information 1715 are four selectable tabs. When selected, as shown in FIG. 17, on TV tab 1717 lists all the forthcoming showings 1719 of episodes of the TV series by time and channel 1721. The channel number 1723 for channel 1721 on a particular TV platform may also be indicated. When selected, on DVD tab 1725 indicates to the viewer if the TV series is available on DVD and will be described in more detail below with reference to FIG. 19. When selected, online tab 1727 indicates to the viewer if the TV series is available online for download. In the present embodiment, the online tab 1727 is hatched out indicating that the TV series is not available for download. In such a case, online tab 1727 cannot be selected. Episode list tab 1729 appears if the search result is a TV series. The functionality associated with episode list tab 1729 will be described in more detail later with reference to FIG. 20.

Figure 18:
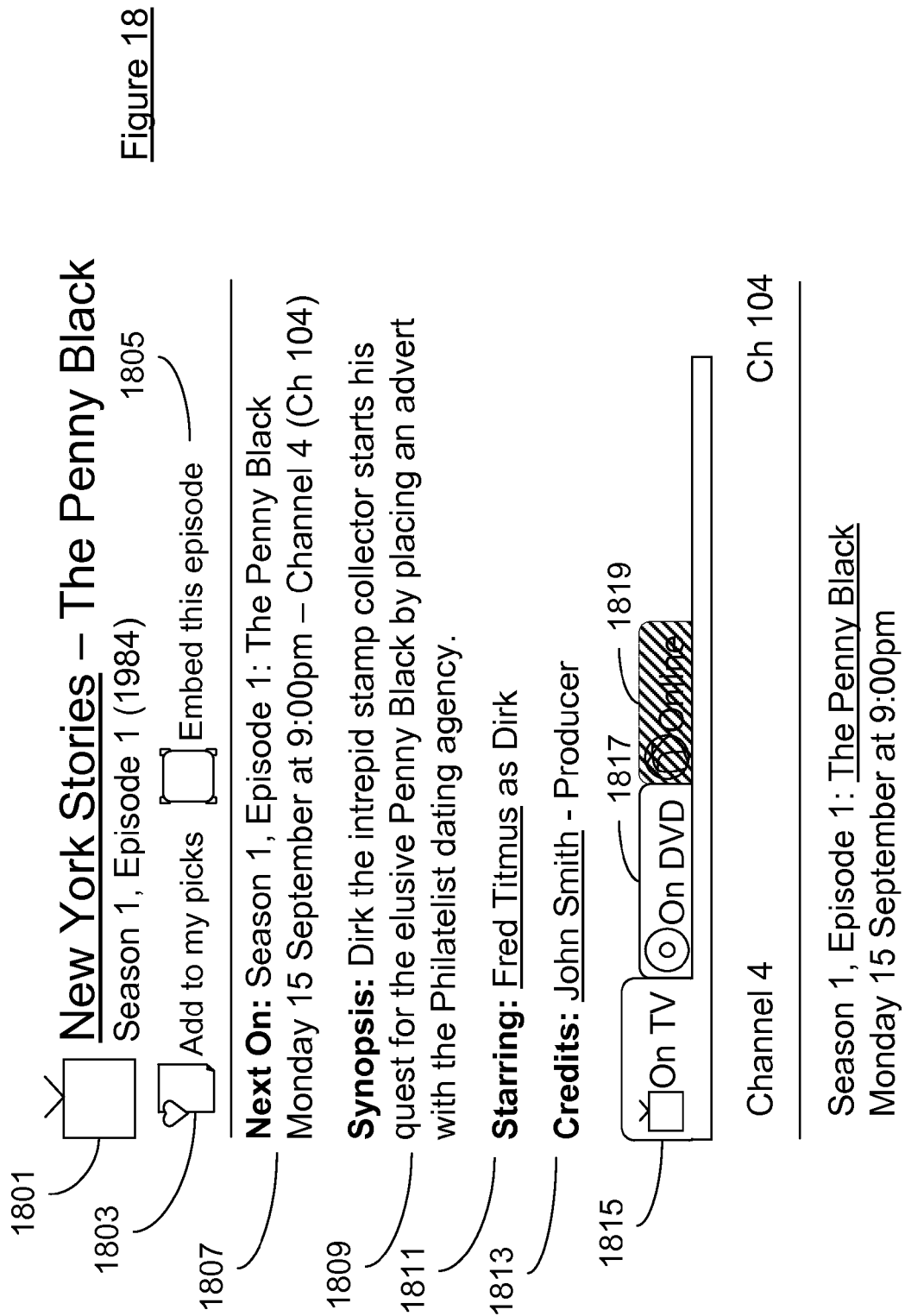

Referring now to FIG. 18, the program details page for the episode "The Penny Black" of television series "New York Stories" will now be described in more detail.

The title 1801 of the TV show is shown at the top of the program details page. In the present embodiment, the title of the TV series is shown together with the title of the specific episode title and additional season and episode information. The title of the TV series is typically underlines indicating that it can be selected in order to navigate to the program details page for the TV series, which it will be remembered was described above in relation to FIG. 17. Below title 1801 are two selectable options: add to my picks 1803; and embed this episode 1805. Add to my picks 1803 has the same functionality as add to my picks option 1703 as described above in relation to FIG. 17. This functionality will be described in more detail below. The functionality associated with embed this episode 1805 option will also be described later.

Next on information 1807 is shown below the two selectable options 1803-1805 and comprises information about when and where the viewer can next watch the episode of the selected TV show in a predetermined time period forward from the time of the search request (e.g. within the next two weeks) for the viewer's geographic location and TV platform. The details of which episode is available to view next (e.g. Season 1, Episode 1) is also provided as well as the title of the episode ('The Penny Black').

Below next on information 1807 is synopsis information 1809, starring information 1811 and credits information 1813, which are similar to synopsis information 1711, starring information 1713 and credits information 1715 as described above in relation to FIG. 17 but which specifically relate to the episode of the TV series and not the TV series as a whole.

Below credits information 1813 are three selectable tabs: on TV tab 1815; on DVD tab 1817 and online tab 1819, which are similar to on TV tab 1717, on DVD tab 1725 and online tab 1727 as described above in relation to FIG. 17 but which specifically relate to the episode of the TV series and not the TV series as a whole.

Figure 19:
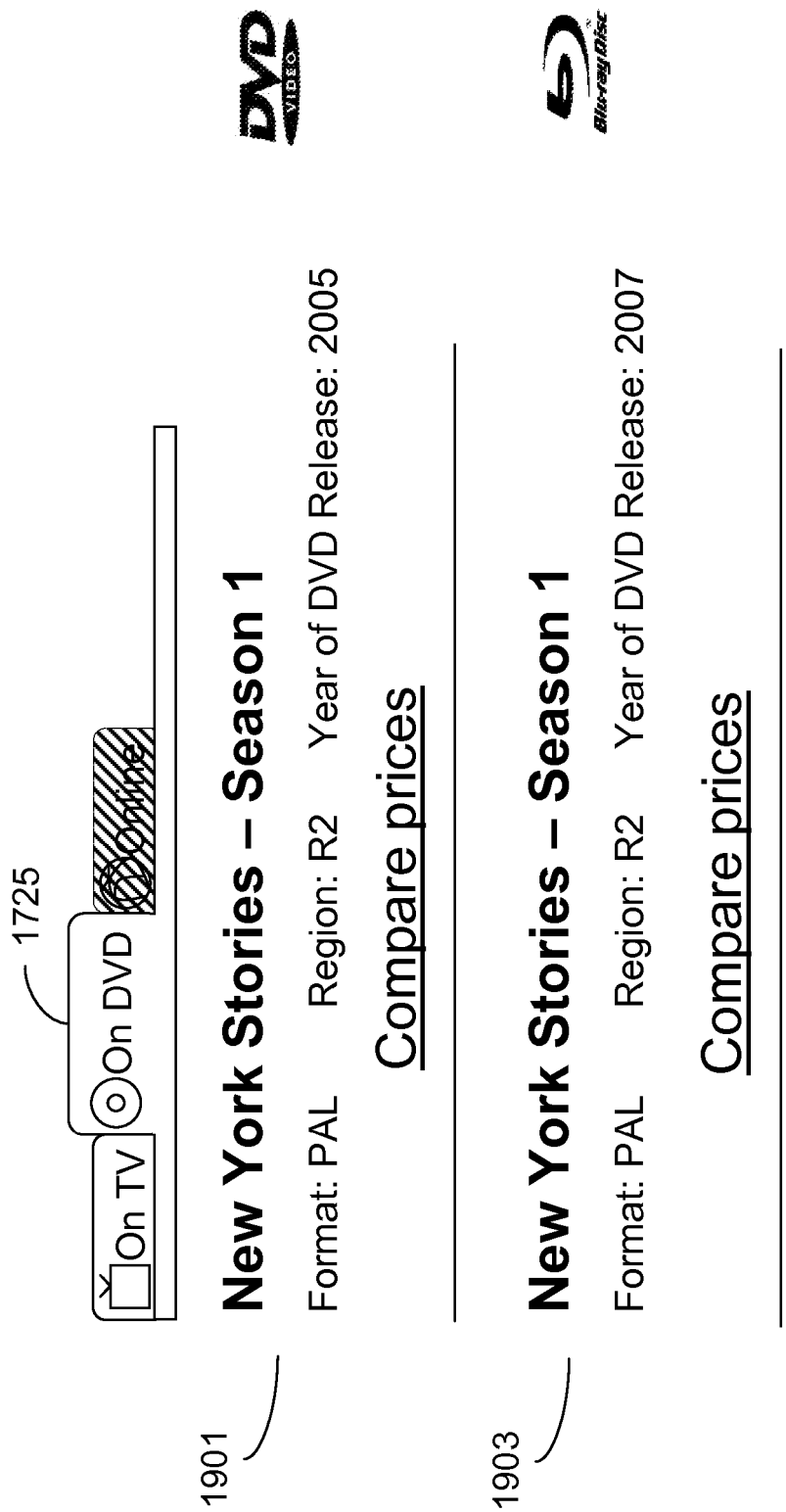

Referring now to FIG. 19, on DVD tab 1725, when selected, indicates to the viewer if the selected TV series is available on DVD. If the TV show is not available on DVD then the tab is typically not selectable and is typically indicated as such (e.g. by showing the tab dimmed or hatched). If the DVD is available in different versions or packages, all the options are listed as shown in FIG. 19 where options 1901 and 1903 are shown for the DVD and Blu-Ray Disc versions of the TV show respectively. By selecting one of the "Compare Prices" selectable options, the viewer can typically compare the prices of the selected version/package at a number of different online retailers. Links are also typically provided directly to the sites of the retailers making it easy for the viewer to buy what the viewer is searching for.

Figure 20:
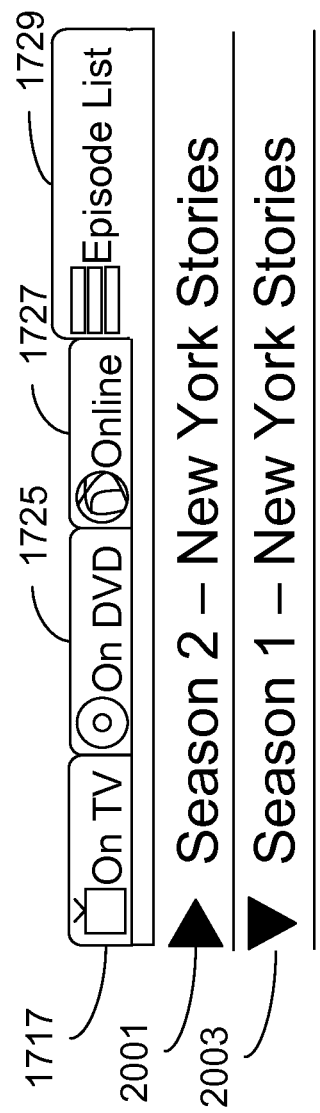

Referring now to FIG. 20, episode list tab 1729, when selected enables the viewer to see synopsis and viewing information for episodes of a TV series. The episodes are typically grouped together into seasons 2001/2003, which can be expanded and collapses with selection of the season title bar by the viewer. Synopsis and viewing information 2003 for episodes in a selected season is shown below the selected season title bar. Each episode is listed separately and includes any "next on" information for the viewer's geographic location (and sometimes TV platform) where available. The episode titles are underlined indicating that they are selectable in order to navigate to the program details page for that specific episode.

Figure 21A:
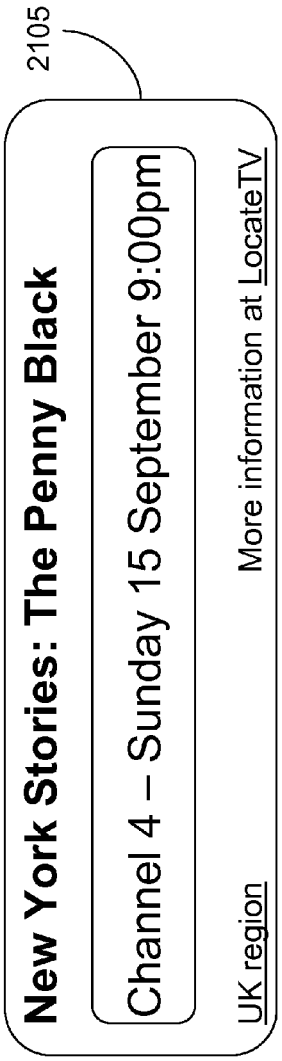

Referring now to FIGS. 21*a* and 21*b*, the functionality associated with the embed this series 1705 option and the embed this episode 1805 will now be described. Embedding a TV show, series, movie, actor or crew member onto/into a web page, blog, web forum etc. enables the viewer (the embedder) to recommend that TV show, series, movie, actor or crew member to other readers of that web page, blog, web forum etc. The readers can see when the embedders recommendations are next showing (or if they are available on DVD or online for download) without having to visit the LocateTV website and from within the web page, blog, web forum etc. The image based embed updates itself automatically to always display the latest available "next on" information for the reader's geographic location (and sometimes TV platform).

In order to set up an embed, the viewer selects the embed this series 1705 option or the embed this episode 1805 in the heading bar for the TV show. (It is to be noted that although not shown in the figures, embed this person options would be displayed to the viewer on people details pages thus allowing a viewer to set up an embed for a cast or crew member of a TV show.) The viewer is then presented with a first option 2101 to select a design for the embed. In the present embodiment, the viewer can choose between a wide formatted embed (381×85 pixels) or a think formatted embed (205×103 pixels) by filling in one of the radio buttons 2103 alongside each of the design options. The actual designs 2105/2107 of the wide and thin formatted embeds are typically shown to the viewer to assist the viewer in choosing a design format.

The viewer is then presented with a second option 2109 to select a code format for the embed. The viewer's selection of code format will typically depend on the sort of webpage into/onto which the viewer wants to place the embed (e.g. a simple webpage (such as a blog) or a web based forum).

Once the viewer has selected an option for the design and for the code format, LocateTV generates some HTML code for the embed which the viewer is instructed to copy and paste onto/into the webpage where the embed is desired to appear (see FIG. 21*b*).

Referring now to FIG. 22, a further embodiment of the present invention will now be described. In this embodiment, the viewer can use a 'What's On TV?' feature in order to discover what is being shown on TV at that moment, what is to be shown next (including how much time there is before the start of the TV show (e.g. how many minutes to go) and what is to be shown during a pre-determined prime time period of television viewing (e.g. 7 pm to 9 pm).

FIG. 22 shows a typical screen shot for what a viewer might see when using the 'What's On TV?—Prime Time 7-9 pm' feature. TV guide topics 2201/2203/2205 (or categories of TV show) are displayed down the left hand side of the screen. Associated with each of the TV guide topics are a number of different genres (e.g. genres 2207), which are underlined indicating that the genres are selectable. The number in brackets after each of the genres indicates the number of TV shows currently included in that genre.

In the present embodiment, the viewer is looking at what TV shows are to be shown during 'Prime Time' and decides to select the 'Adventure' genre from within the 'Entertainment' guide topic. The name of the genre is typically added to the TV guide topic (as shown) and the genre itself is typically made bold (as shown). On selecting the genre, the list then expands to show when and where (i.e. on what channel) the TV shows are showing. The 'when' and 'where' information is relevant to the viewer's geographic location (and TV platform where available).

If the viewer selects the 'Now & Next' tab at the top of the screen, the viewer is able to discover what is being shown on TV at that moment and what is to be shown next (including how much time there is before the start of the TV show (e.g. how many minutes to go).

It will be appreciated that a range of alternative webpage layouts and ways of presenting information to the viewer are possible.

The add to my picks 1703/1803 options enables the viewer to keep track of favourite programs, movies and actors. To add an item (e.g. a TV series, episode, show, actor, crew member) to 'My Picks' the viewer selects the 'add to my picks' option in the heading bar on the appropriate program or people details page. The 'My Picks' list can then be accessed by the viewer on a separate page of the LocateTV service. On the 'My Picks' page, the viewer can review the items on the 'My Picks' list, see when the items are next showing on TV in the viewer's geographic location, see whether any items are available on DVD or online, and remove items from the list. The viewer is also given the opportunity to share the 'My Picks' list with other people by way of an internet link that the viewer can copy onto a webpage, blog, forum, other website or into an email. In the present embodiment, the 'My Picks' list uses cookies stored on the computer on which the viewer is accessing the LocateTV service from when deciding to add items to the 'My Picks' list.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof.

What is claimed is:

1. A method of providing information about video content to a user of a client device, said method comprising:
   receiving a request from the client device requesting information about video content, wherein, without input from the user and prior to rendering a web page to which the user has navigated, said request is automatically created and submitted by said client device in response to said client device parsing a portion of hypertext markup language text, said request including an internet protocol address of said client device;
   establishing (a) a geographic location of said client device from said internet protocol address; and (b) a time of said request;
   identifying one or more content providers available in said geographic location;
   in dependence on said one or more content providers and said time, retrieving information about said video content from a database; and
   providing said information to said client device.

2. The method of claim 1, wherein said client device comprises one of a plurality of client devices parsing portions of hypertext markup language text when loading websites, and wherein said method further comprises:
   for each website, recording automatic requests received from said plurality of client devices in response to said client devices parsing portions of hypertext markup language text when loading each website;
   ranking said websites in dependence on a number of recorded automatic requests; and
   providing ranking data to said client devices in response to a request received from said client devices.

3. The method of claim 1, wherein said portion of hypertext markup language text is supplied to said client device in response to a previous request received from said client device.

4. The method of claim 1, wherein said information is provided in the form of an image.

5. The method of claim 4, wherein said image comprises one or more hyperlinks.

6. The method of claim 1, wherein said one or more content providers comprise television platforms, and wherein said video content comprises video content broadcast by at least one television platform.

7. The method of claim 6, wherein said information comprises a time at which said video content is next available and a channel on which said video content is next available.

8. The method of claim 1, wherein said video content comprises video content available for download from at least one of said one or more content providers via the internet.

9. The method of claim 8, wherein said information comprises one or more links to websites of said one or more content providers from where said video content can be downloaded.

10. The method of claim 9, wherein said information further comprises costs of downloading said video content from said websites.

11. The method of claim 1, wherein said video content comprises video content available to purchase as recorded media from at least one of said one or more content providers.

12. The method of claim 11, wherein said information comprises one or more links to websites of said one or more content providers from where said recorded media can be purchased.

13. The method of claim 12, wherein said information further comprises costs of purchasing said recorded media from said websites.

14. The method of claim 1, further comprising providing related information to said client device if information about said video content is not available, wherein said related information comprises related information about related video content related to said video content.

15. Apparatus for providing information about video content to a user of a client device, said apparatus comprising:
means for receiving a request from the client device requesting information about video content, wherein, without input from the user and prior to rendering a web page to which the user has navigated, said request is automatically created and submitted by said client device in response to said client device parsing a portion of hypertext markup language text, said request including an internet protocol address of said client device;
means for establishing (a) a geographic location of said client device from said internet protocol address; and (b) a time of said request from said request;
means for identifying one or more television platforms available in said geographic location;
means for retrieving information about said video content from a database in dependence on said one or more television platforms and said time; and
means for providing said information to said client device.

16. Apparatus operable to provide information about video content to a user of a client device, said apparatus comprising:
a server comprising a processor and memory to:
receive a request from the client device requesting information about video content, wherein, without input from the user and prior to rendering a web page to which the user has navigated, said request is automatically created and submitted by said client device in response to said client device parsing a portion of hypertext markup language text, said
request including an internet protocol address of said client device;
establish (a) a geographic location of said client device from said internet protocol address; and (b) a time of said request from said request;
identify one or more television platforms available in said geographic location;
retrieve information about said video content from a database in dependence on said one or more television platforms and said time; and
provide said information to said client device.

* * * * *